Figure 1:
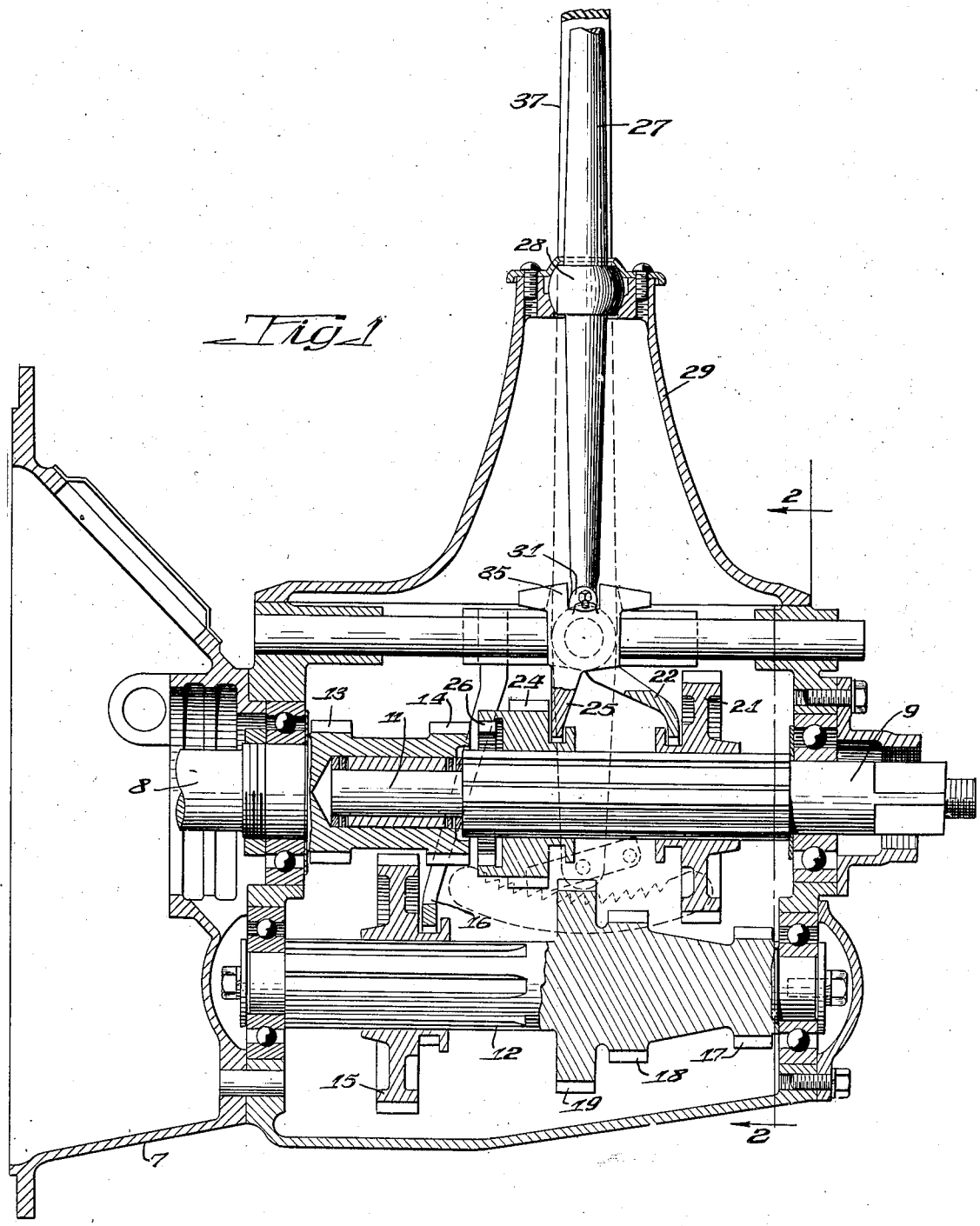

Nov. 10, 1925.

C. L. ANDERSON 1,561,045

CHANGE SPEED TRANSMISSION

Filed Aug. 15, 1921 2 Sheets-Sheet 1

Inventor
Carl L. Anderson
By Ira J. Wilson
Atty.

Nov. 10, 1925. 1,561,045
C. L. ANDERSON
CHANGE SPEED TRANSMISSION
Filed Aug. 15, 1921 2 Sheets-Sheet 2
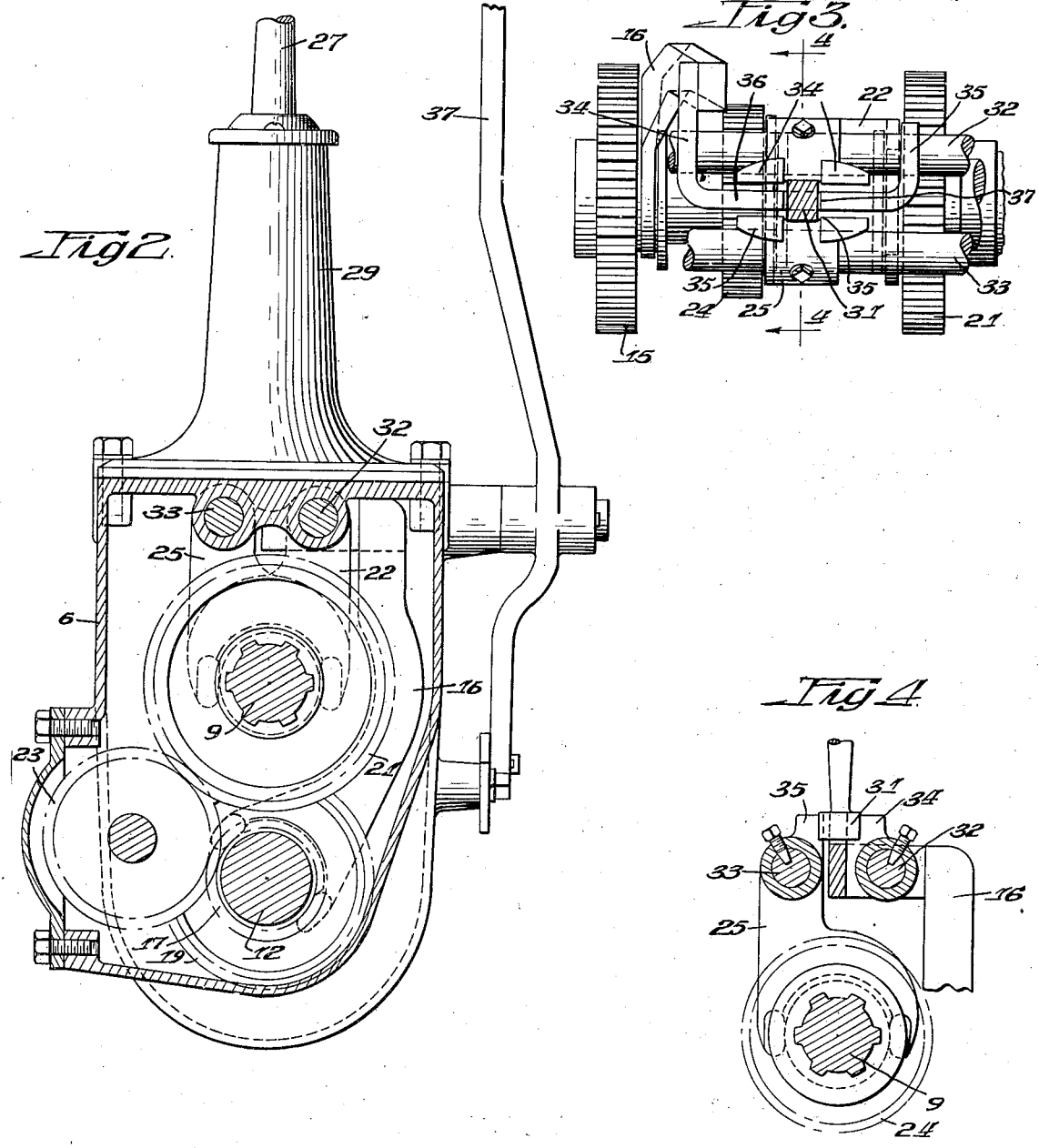

Patented Nov. 10, 1925.

1,561,045

UNITED STATES PATENT OFFICE.

CARL L. ANDERSON, OF ROCKFORD, ILLINOIS, ASSIGNOR, BY DIRECT AND MESNE ASSIGNMENTS, TO MECHANICS MACHINE COMPANY, OF ROCKFORD, ILLINOIS, A CORPORATION OF ILLINOIS.

CHANGE-SPEED TRANSMISSION.

Application filed August 15, 1921. Serial No. 492,390.

*To all whom it may concern:*

Be it known that I, CARL L. ANDERSON, a citizen of the United States, residing at Rockford, in the county of Winnebago and State of Illinois, have invented certain new and useful Improvements in Change-Speed Transmissions, of which the following is a specification.

This invention relates to change speed gear transmission, particularly adapted for motor vehicles for transmitting the drive between the clutch and propeller shaft and for effecting changes in speed. These speeds comprise what is recognized by automotive engineers as standard, viz: first, second and third (direct) speeds and reverse. The invention is, however, not limited to this particular change speed combination, since in some instances greater or less number of changes is desired, especially in transmissions for trucks which generally employ four speeds forward and a reverse.

Transmissions of this type generally include a counter-shaft and gears which are continuously revolved during the several speeds, also the neutral position when the engine is idling. These gears in most instances are to a greater or less extent submersed and run in heavy oil or lubricant in the transmission casing, consequently there is a very noticeable loss of power, especially during cold weather when the oil is thick and sometimes reaches a very heavy consistency. Furthermore, gear noise develops and is often very noticeable in neutral and the direct speed.

It is the primary object of the present invention to overcome the foregoing objections by the provision of a change speed gear transmission of novel construction which eliminates loss of power and gear noise especially during the neutral and direct speed positions of the gears.

In furtherance of this general object, my invention contemplates a novel organization of gearing and control mechanism for shifting certain of the gears to effect the different changes. In this arrangement, there are no revolving gears in mesh during the neutral and direct speed positions, and by this means the frictional resistance causing loss of power is eliminated, and also there is no cause for gear noise.

Another object is to provide a generally improved change speed gear transmission constructed in such novel manner that it may be produced at a comparatively low cost and will efficiently serve the purposes for which it is designed.

Still another object is to provide a transmission of the character described including three gear shifting forks or yokes adapted to be shifted by only two slide rods operated from a common control lever. To this end, I have provided a novel organization of elements co-operating with a novel system of gearing for the purposes in mind.

Other objects and attendant advantages will be appreciated by those familiar with this art as the invention becomes better understood by reference to the following description when considered in connection with the accompanying drawings, in which—

Figure 1 is a longitudinal vertical section through a change-speed gear transmission embodying my invention;

Fig. 2, a transverse sectional view taken substantially on the line 2—2 of Fig. 1;

Fig. 3, a fragmentary top view of the shiftable elements; and

Fig. 4, a fragmentary sectional view taken substantially on the line 4—4 of Fig. 3.

The gear transmission shown in the accompanying drawing for purpose of illustration, is particularly designed for application as a unit interposed between the clutch and propeller shaft. This particular application is not, however, essential, since the principles described herein may be applied in various ways in the design of change speed gear transmission, although particularly advantageous when applied to automotive engineering.

The transmission casing designated generally by 6 is secured to a clutch casing 7, the arrangement being conventional. A driving shaft 8 and a driven shaft 9 are coaxially journaled in suitable bearings in the casing, the driven shaft having a pilot end 11 journaled in the rear end of the driving shaft. A counter-shaft 12 is also suitably journaled in the casing.

A system of gearing is now provided between these shafts, whereby three speeds forward and one reverse may be obtained. It will be understood, however, that a greater or less number of speed changes might be obtained without departing from the invention disclosed herein, by provision of the requisite gearing for the purpose. In the present example, the speed changes are recognized as standard for motor vehicles and especially pleasure cars and light commercial vehicles. A novel arrangement of gearing is utilized for the purpose of this invention.

This gearing comprises gears 13 and 14 of equal diameter formed integral with the driving shaft 8. A counter-gear 15 splined on the shaft 12 is interposed between the gears 13 and 14 and adapted to be moved into mesh with either of said gears by operation of a shifting fork designated generally by character 16, which will be described more fully hereinafter. The counter-shaft carries a cluster of fixed gears 17, 18 and 19 at present formed integral with the shaft. These are the reverse, first and second speed gears, respectively. A gear 21 splined on the driven shaft 9 is adapted to be shifted thereon by the fork 22 into mesh with either the first speed gear 18 or the reversing gear 23 (Fig. 2) which meshes with the gear 17. A gear 24 also splined on the driven shaft 9 may be moved by the fork 25 either rearwardly into mesh with the gear 19, establishing the second speed, or forwardly for connection with the gear 14. This latter connection is established by internal gear teeth 26 integral with the gear 24, adapted to mesh with the gear 14. A clutch connection is thus established directly between the driving and driven shafts, giving a direct or third speed.

A control or shift mechanism is now provided, including the shifter forks mentioned, whereby the several shiftable elements may be moved in proper timed relation for effecting the different changes in speed. This comprises a control lever 27 having the well known ball and socket mounting 28 on the cover 29 of the gear casing. The lower end 31 of the control lever has a boss or is shaped to engage either of two sets of shifting forks, one of which forks is common to each set. The yokes 22 and 25 are fixed to the slide shafts 32 and 33 respectively, and have upstanding forked ends 34 and 35 either of which is adapted to be engaged by the end 31 of the control lever. The shifting yoke 16 reaches upwardly at the right-hand side of the driving and driven shafts, as shown in Fig. 2, and is secured at its upper end to or formed integral with, as the case may be, a U-shaped fork portion, the arms 34 and 35 of which are slidably supported on the shaft 32 and the central portion 36 of which is disposed intermediate the forks 34 and 35, and has a notch 37 in which is disposed the end 31 of the control lever. The shifting forks or yokes are so shaped and pro-portioned as to hold the several gear elements in the position shown in Fig. 1, known as the neutral position.

The control lever is operated after the fashion of the so-called standard gear shift to obtain the three speeds forward and one reverse. Assuming the shaft 8 to be in rotation, if the upper end of the control be tilted to the left (as viewed from above in the position of the operator), the lower end 31 of the lever will be engaged in the forks 34 and 36. Upon swinging the lever to the rear the gear 15 will be moved forwardly into mesh with the gear 13, thereby revolving the counter-shaft; and the gear 21 will likewise be moved forwardly into mesh with the gear 18, thereby driving the shaft 9 at the first or slow speed forward. It will be observed that the counter-shaft which during the neutral position remains idle, will be put into rotation, just prior to the connection of the first speed gears 18 and 21. Upon moving the lever forwardly, the yokes 22 and 36 will be shifted in unison to establish the reverse drive by first engaging the gear 15 with the gear 14 and then the gears 21 and 23. After returning the control lever to the neutral position and swinging its upper end to the right for the purpose of positioning its lower end 31 in operative engagement with the forks 35 and 36, the second and third speeds forward may be obtained by moving the lever forwardly and rearwardly, respectively. When the lever is moved forwardly, the forks 35 and 36 will be simultaneously shifted to connect the gears 14 and 15 and the gears 19 and 24, thus establishing the second speed. Moving the control lever to its rearmost position will engage the gear teeth 26 with the gear 14, establishing the direct or third speed; and in this position the gear 15 will be disposed just at the rear of and out of engagement with, the gear 13 so that during the direct speed, the counter-shaft remains idle.

The last mentioned movement of the gear 15 forwardly but not into mesh with the gear 13 when the gear teeth 26 and gear 14 are engaged is limited by the body of the gear 24—26 striking against the adjacent end of the gear 14, thereby positively preventing engagement of the gears 13 and 15 in the direct speed position. In the other instance above mentioned, in which the gear 15 is moved forwardly with the gear 21 it will be observed that the shifting movement is of greater length in order to permit the gear 15 to be brought into full mesh with the gear 13. The forward shifting movements of the gear 15 of different length are made possible because in each case said gear is shifted in connection with a separate device, in one instance with the forks 22—34 and in the other by the forks 25—35. Thus the gear 15 is shifted each time one of the forks 22—34 and 25—35 is shifted for effecting any change in speed but in one instance in effecting the direct connection, the shifting movement is short so that there will be no connection between gears 13 and 15 and consequently the countershaft will be idle on direct.

It follows, therefore, that during both the neutral and direct speed positions the counter-shaft and connected gears do not revolve, and consequently are not a source of power loss, as is the case in those constructions in which the counter-shaft and gearing are always in driving connection with the driving shaft. This loss of power is especially noticeable during cold weather, due to the heavy consistency of the lubricant in the gear casing. Gear noise is also practically entirely eliminated as there are no gears running in mesh during neutral and the direct speed, these being the two positions most used. While gear teeth 14 and 26 are utilized for the direct speed connection, it will be observed that they are, in fact, a clutch connection, and there is no meshing of gears as when gears run in mesh. Furthermore, any suitable direct connection may be provided between the driving and driven shafts. The brake lever 37 forms no part of the present invention.

It is believed that the foregoing conveys a clear understanding of the objects prefaced above, and while I have illustrated but a single working embodiment, it should be understood that considerable change might be made in the construction and arrangement without departing from the spirit and scope of the invention as expressed in the appended claims.

I claim:

1. In a change speed transmission, in combination, a driving and a driven shaft in coaxial relation, a countershaft, change speed gearing operable between the counter-shaft and said driving and driven shafts including a gear shiftable on the countershaft and a gear shiftable on the driven shaft, a shiftable element for establishing a driving connection between the driving and driven shafts, and means for optionally shifting said driven shaft gear and said countershaft gear in unison for effecting changes in speed and for shifting said element and the countershaft gear for effecting a change in speed or said direct connection, the countershaft gear being out of driving connection with the driving shaft during the direct speed position and the neutral position.

2. In a change speed transmission, in combination, a driving and a driven shaft in coaxial relation, a countershaft, gears 13 and 14 fixed to the driving shaft, a gear 15 splined on the countershaft, gears 18 and 19 fixed to the countershaft, gears 21 and 24—26 splined on the driven shaft, and control means for shifting said splined gears for effecting changes in speed and for holding the countershaft gear 15 out of mesh during neutral and direct speed positions, said means including a shifting device for the gears 15 and 21 and another for the gears 15 and 24—26, the gear 15 being shifted by each device and by engagement with the gears 13 and 14 when shifted in opposite directions except when the gear 24—26 is engaged with the gear 14.

3. In a change speed transmission, the combination of a driving shaft having a pair of fixed axially spaced gears, a driven shaft, a counter-shaft, means operable between said shafts for effecting changes in speed including a gear splined on the counter-shaft between said driving gears movable into mesh with said gears respectively for certain speeds and held out of mesh during neutral and the direct speed.

4. In a change speed transmission, the combination of a pair of spaced driving gears of equal diameter, a counter-shaft gear interposed between and adapted to mesh with either of said driving gears, a cluster of counter-gears coaxial and in driving relation with said shiftable counter-gear, a first and a second speed gear coaxial with said driving gears, and shiftable for engagement with said cluster of counter-gears and said second speed gear being shiftable for connection with one of said driving gears, and control means for causing said counter-gear to be shifted with each of said first and second speed gears into mesh with one or the other of said driving gears upon engagement of the first and second speeds, respectively, and for holding said counter-gear out of mesh with said driving gears during neutral and the direct speed.

5. A change-speed gear transmission comprising a driving shaft having a pair of longitudinally spaced gears fixed thereto, a driven shaft having a reverse and a second speed gear splined thereon, a counter-shaft having fixed first and second speed gears and a reverse gear, an intermediate gear meshing with the reverse gear on the counter-shaft and adapted to be engaged by one of the shiftable reverse gears on the driven shaft, a gear splined on the counter-shaft and adapted to engage either of the gears on the driving shaft, and control mechanism for operating said shiftable gears, whereby to effect first, second and direct speeds and reverse and to leave the counter-shaft idle during neutral and the direct speed.

6. In a change-speed gear transmission, the combination of a pair of driving gears, a shiftable direct and second speed gear, a cluster of counter-gears, a reversing gear in mesh with one of the cluster gears, a first speed and reversing gear adapted to be shifted respectively into mesh with one of said cluster gears and said reversing gear, a shiftable counter-gear, and means for operating the shiftable gears to transmit first, second and direct speeds and reverse and leaving the cluster gears and shiftable counter-gear idle during neutral and the direct speed.

7. In a change-speed gear transmission, the combination of a driving and a driven shaft, a counter-shaft, gearing operable between said shafts for effecting changes in speed and including a pair of shiftable gears on the driven shaft and a shiftable gear on the counter-shaft, and means for optionally shifting either of said gears on the driven shaft and simultaneously shifting the gear on the counter-shaft, whereby to effect speed changes and for leaving the counter-shaft idle during neutral and the direct speed.

8. In a change-speed gear transmission, the combination of a driving and a driven shaft, a counter-shaft, gearing between said shafts for effecting changes in speed including a pair of shiftable gears on the driven shaft and a shiftable gear on the counter-shaft, and a control mechanism for simultaneously shifting the counter-shaft gear with each of the shiftable gears on the driven shaft, said counter-shaft gear being shiftable for connection with the driving shaft and being unconnected thereto during neutral and the direct speed.

9. In a change-speed gear transmission, the combination with a system of gearing including three shiftable gear elements for effecting three speeds and reverse, a pair of slide rods, a yoke fixed to each rod, one yoke for moving one of said shiftable gear elements and the other for moving another of said gear elements, a control lever for shifting either of said yokes at will, and a third yoke connected with the third gear element and adapted to be moved by said control lever upon operation of either of the first mentioned yokes.

10. In a change-speed gear transmission, the combination of a driving and a driven shaft, a system of gearing between said shafts including intermediate gears and three shiftable elements for obtaining changes in speed, two slide rods carrying forks for operating two of said shiftable elements, the third shiftable element being mounted on one of said slide rods and movable independently thereof, and means for shifting either one of said slide rods and the third shifting fork in unison.

CARL L. ANDERSON.